June 26, 1923.

E. J. McCLELLAN

TAPPING MACHINE

Filed April 23, 1921

INVENTOR.
E. J. McClellan
BY
Rogers, Kennedy & Campbell
ATTORNEYS.

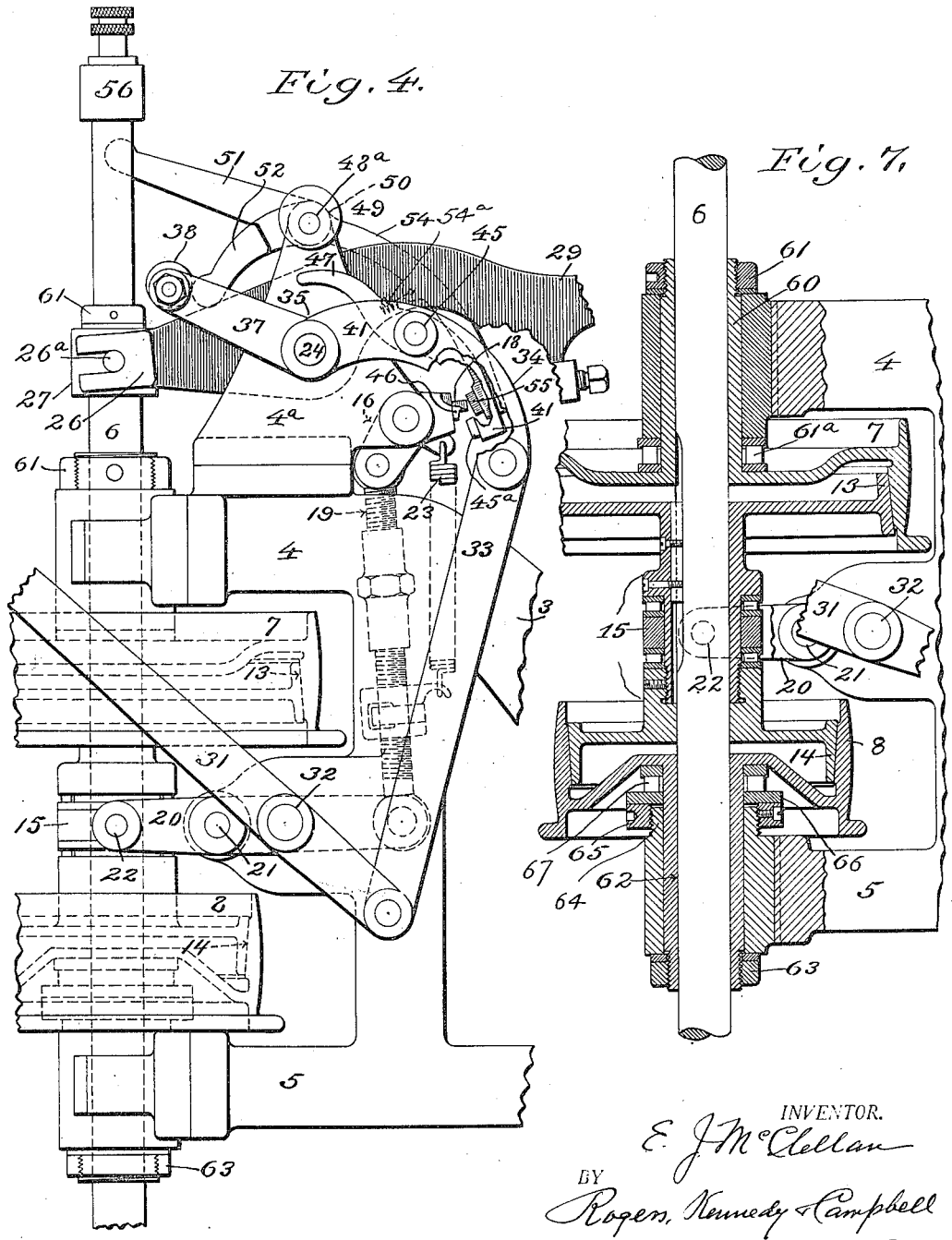

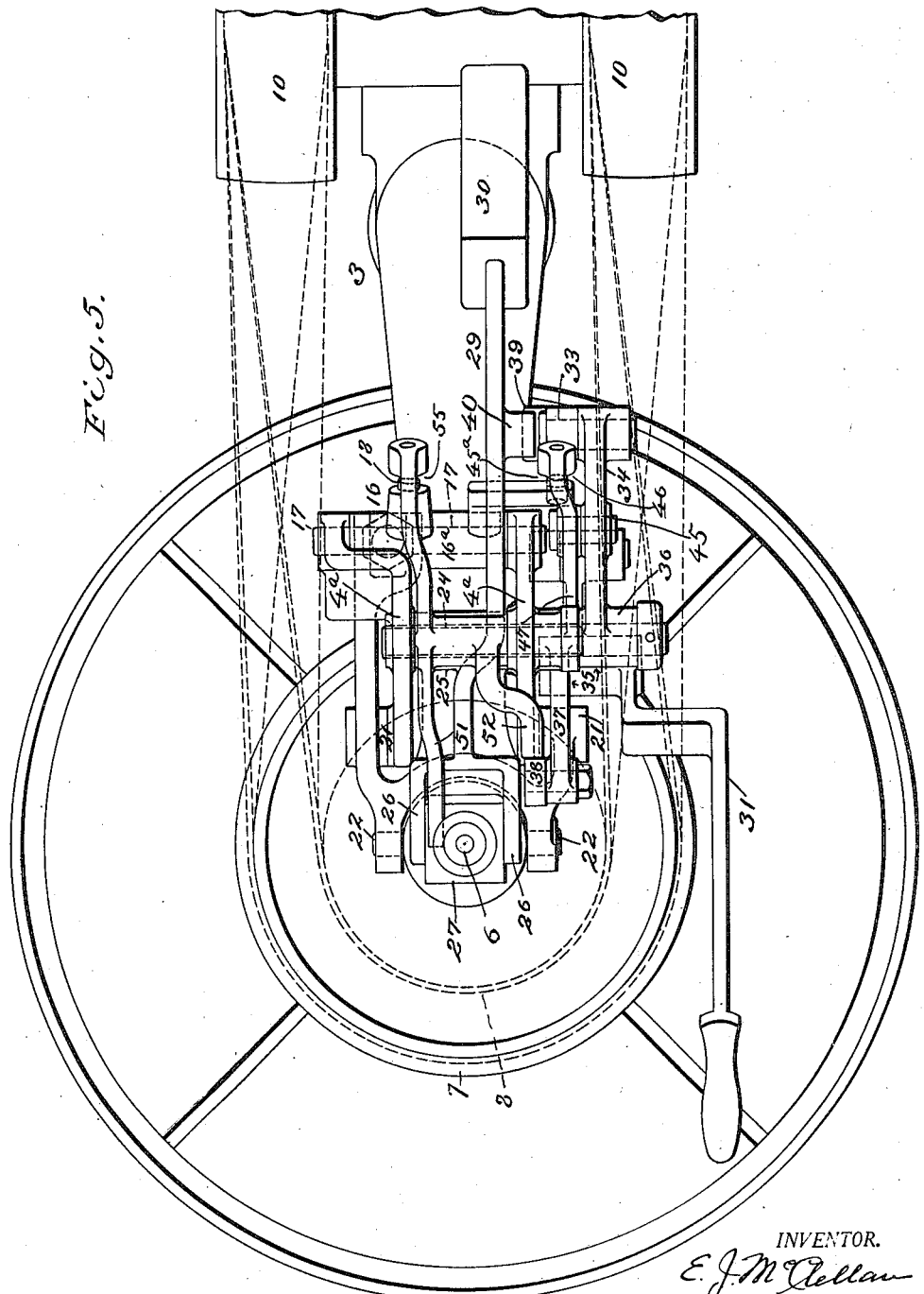

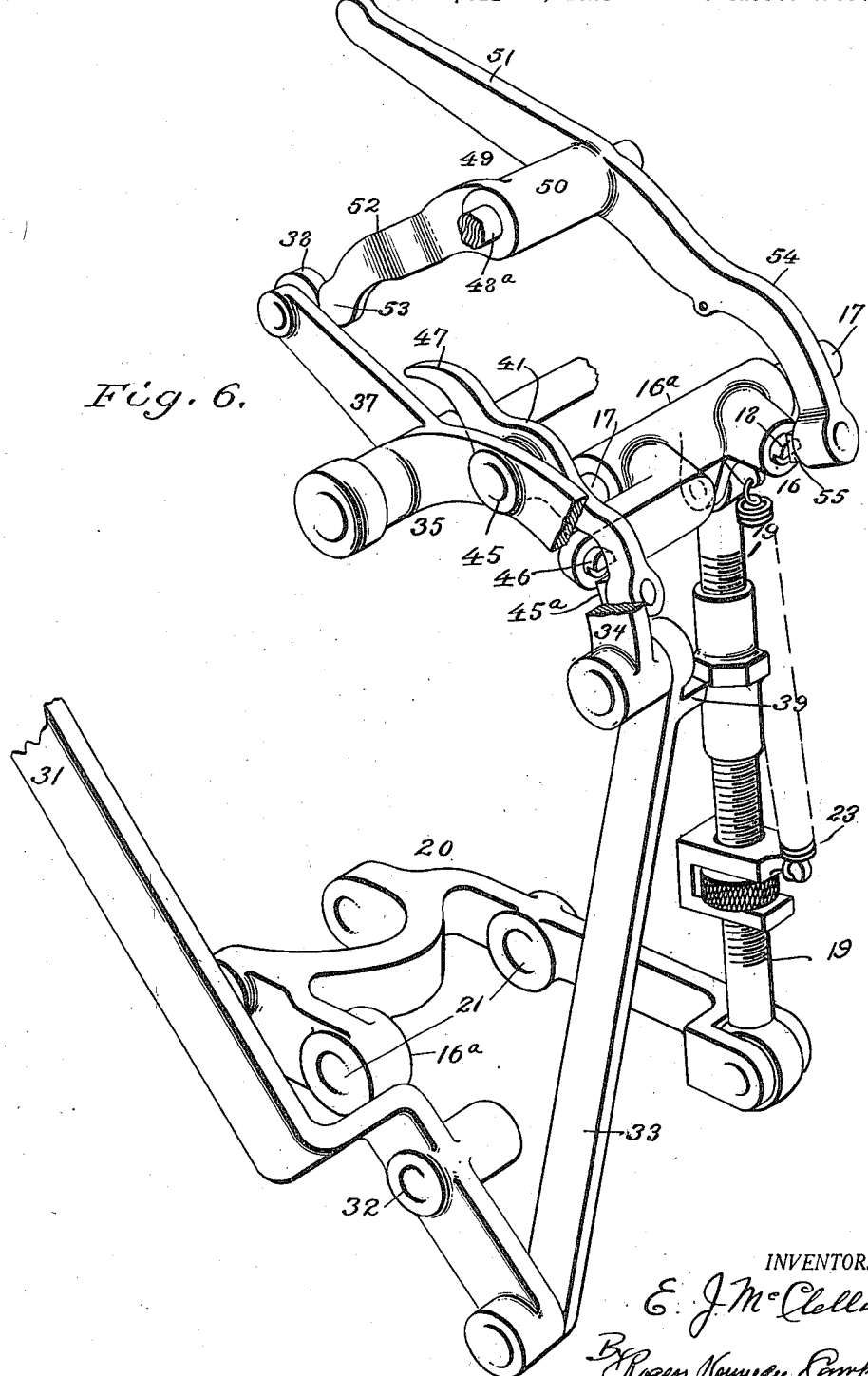

Patented June 26, 1923.

1,459,981

UNITED STATES PATENT OFFICE.

EDWARD J. McCLELLAN, OF NEW YORK, N. Y., ASSIGNOR TO THE GARVIN MACHINE COMPANY, A CORPORATION OF NEW YORK.

TAPPING MACHINE.

Application filed April 23, 1921. Serial No. 463,988.

*To all whom it may concern:*

Be it known that I, EDWARD J. McCLELLAN, a citizen of the United States, residing at New York, in the county of New York and State of New York, have invented certain new and useful Improvements in Tapping Machines, of which the following is a specification, reference being had therein to the accompanying drawing.

This invention relates to tapping machines of the type in which a tapping tool carried by a rotary driven tapping spindle is entered in the hole to be tapped or threaded, and after cutting the threads therein, the spindle is reversed in rotation so as to unscrew the tap from the hole, and the invention has special reference to a machine of this type in which the reversal of the rotation of the spindle is effected automatically on the completion of the tapping operation. In a certain type of machine embodying these characteristics, and to which the present invention is peculiarly adapted to improve its operation and to provide for the more effective control by the attendant, the tapping spindle is mounted for up and down movement through two driving pulleys driven continuously in opposite directions respectively, a shifting clutch member being splined to the spindle and so actuated that when shifted to one position or the other the spindle will be connected to one or the other of the two driving pulleys. The spindle is engaged by a counterbalancing rocking lever and carries a rocking detent in position to engage and operate clutch actuating mechanism operatively connected with the shifting clutch member, such operation taking place when the counterbalancing lever is rocked to move the spindle down to enter the tap in the hole in the work, and acting to clutch the spindle to the upper driving pulley for tapping rotation. An actuating lever is pivoted in the frame and connected with the counterbalancing lever in such manner that when the actuating lever is depressed, the counterbalancing lever will be rocked as described, and the tapping operation initiated. A trip latch is mounted in the frame in such position that when the clutch member is shifted and engaged as described, the trip latch will automatically engage the clutch actuating mechanism and will hold the clutch engaged, the detent in the meantime being automatically operated to release the clutch. The tapping operation being thus started with the clutch held engaged by the trip latch, the tap on the spindle will be screwed into the work, and when the operation is completed a trip head on the spindle will engage and trip the latch and thus release the clutch actuating device, whereupon the clutch will be shifted by a spring acting on the actuating device, and the spindle will be clutched to the lower driving pulley and rotated in the opposite direction and thus unscrew the tap from the threaded hole. From the nature of the construction above outlined, it will be understood that the tapping operation having once started, the tapping tool will continue to screw into the work uninterruptedly until the clutch is tripped at the end of the operation. For certain kinds of work, where, by nature of the character of the metal acted on the resistance to the advance of the tap is not unduly great, this machine will operate satisfactorily, but in cases where the metal possesses greater hardness, such for instance as is now generally employed for gears and other parts of automobiles and for other purposes, the resistance to the advance of the tap is so great as to cause the same to bind or stick in the hole, which results in an interruption in the tapping operation and frequently in the breakage of the tap or parts of the machine.

The aim of the present invention is to overcome the objections due to the conditions mentioned, and the invention consists of improved features of construction and arrangement of parts whereby the attendant will have complete control of the tap spindle at all times and will be enabled to reverse the rotation of the spindle at any stage in the tapping operation, independently of the automatic reversing action, and may so control the clutch that the tapping operation may be effected in progressively advancing stages by a nursing action as it were. These improved features of construction will be fully described in the specification to follow, and the novel parts thereof will be set forth in the appended claims.

In the accompanying drawings:

Fig. 4 is a similar view showing how the spindle is reversed in rotation before the end of the tapping operation.

Fig. 5 is a top plan view of the parts shown in Fig. 2.

Fig. 6 is a perspective view of certain details.

Fig. 7 is a vertical sectional elevation showing the mounting of the two driving pulleys and the intermediate clutch member.

Figure 1:
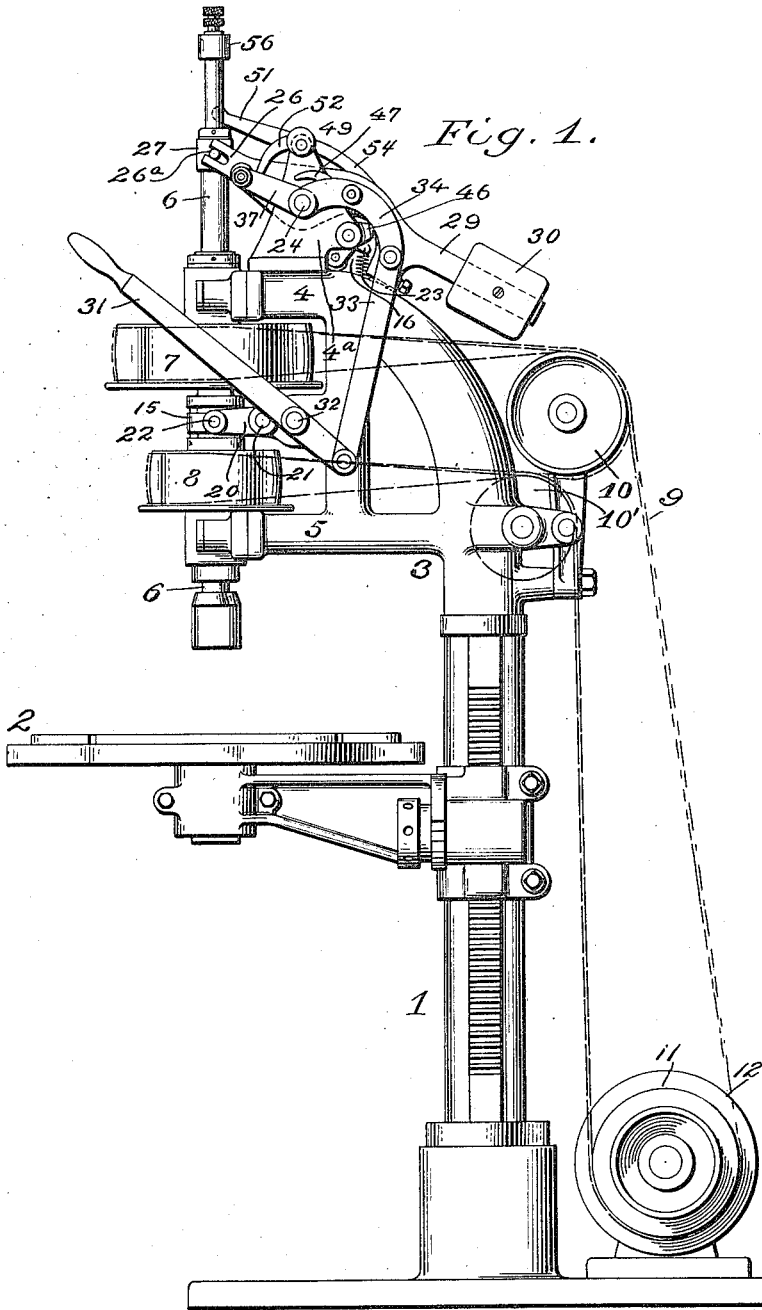
Fig. 1 is a side elevation of a tapping machine having my invention embodied therein.

Referring to the drawings:

The operative parts of the machine are mounted in a suitable frame comprising a standard 1 giving support to a work table 2, which standard is provided at its upper end with a head framing 3 overhanging the table. This head framing is formed with upper and lower horizontal arms 4 and 5 in the forward ends of which a tap spindle 6 is mounted for rotation and up and down movement. Loosely surrounding the tap spindle and journaled in the ends of these arms is an upper driving pulley 7 and a lower driving pulley 8 which pulleys are adapted to be driven constantly in any suitable manner so as to rotate respectively in opposite directions. In the present instance the pulleys are driven by a single drive belt 9 looped around the two pulleys as shown in Fig. 1 and passing around vertical guide pulleys 10 and 10¹ on the back of the framing and around a drive pulley 11 mounted at the base of the frame, which pulley 11 is driven by a pulley 12 receiving its power from a suitable source.

The two pulleys 7 and 8 are formed with interior conical clutch surfaces adapted to be engaged respectively by conical heads 13 and 14 on a shifting clutch member 15 splined to the spindle, so that by shifting the clutch member up and down to cause its conical heads to engage the clutch surfaces on the pulleys, the spindle will be rotated in a direction according to the particular pulley with which the clutch member is for the time being engaged. In the present instance, the upper pulley 7 is rotated in a direction to impart a "tapping" rotation to the spindle, that is to screw the tap into the hole in the work, while the lower pulley is rotated in the opposite direction to impart a reverse unscrewing rotation to the spindle. The clutch member is shifted by means of a clutch actuating mechanism comprising in the present instance a two armed lever 16 formed with an elongated hub or sleeve 16ª mounted to rock on a shaft 17 sustained by bracket plates 4ª extending upwardly from the frame arm 4. The upper arm of this lever is provided with a finger 18 by means of which the clutch actuating mechanism is operated as will be presently described, while the lower arm of the lever has pivoted to it the upper end of a rod 19. The lower end of this rod is pivoted to a horizontal yoke frame 20 pivotally mounted in the frame of the machine on a horizontal axis 21, the arms of the yoke being formed with holes which loosely receive studs 22 projecting outwardly from the shifting clutch member 15. The lower arm of the lever 16, and the rod 19 pivoted to said arm, constitute a toggle lever mechanism which when straightened out when the upper arm is rocked upwardly, will depress the rear end of the yoke frame 20 and shift the clutch member upwardly into engagement with the upper pulley 7, and when said arm is moved in the opposite direction, the rear end of the yoke frame will be raised and the clutch member shifted in the opposite direction and engaged with the lower pulley 8, this reverse movement of the toggle lever mechanism being effected by a spring 23 having its upper end connected with the upper arm of the lever 16 and having its lower end connected with the rod 19.

Mounted to rock on a horizontal shaft 24 sustained by the bracket plates 4ª, is a hub 25 of a counterbalancing lever whose forward arm 26 is forked to extend on opposite sides of the tap spindle. The forks of the arm are formed with open slots loosely embracing pins or studs 26ª projecting outwardly from a collar 27 loosely surrounding the spindle and held against endwise movement thereof. The rear arm 29 of this lever has a counterbalancing weight 30 fixed adjustably thereon. This lever being engaged with the tap spindle in the manner described, will cause the spindle to be moved down to enter the tap in the hole in the work when the rear end of the lever is rocked upwardly, the weight serving to counterbalance the spindle and restore it to its former position when the tap is free of the work. The counterbalancing lever is swung upwardly as described to enter the tap in the hole and to operate the clutch to connect the spindle to the upper pulley to initiate the tapping operation, by means of an actuating lever mechanism including a hand lever 31 pivoted between its ends as at 32 to the head framing, the rear end of which lever has pivoted to it the lower end of a link 33 whose upper end is pivoted to the rear arm 34 of two armed lever 35, the hub 36 of which is mounted to rock on an extension of the shaft 24 before alluded to.

The forward arm 37 of this lever carries on its inner side at its forward extremity a roll 38 containing an eccentrically located opening by which the roll is bolted adjustably to the arm for the purpose presently to be described.

At its upper end the link 33 is provided with a lug 39 projecting inwardly therefrom and extending beneath a boss 40 projecting outwardly from the rear arm of the counterbalancing lever, the arrangement being such that when the link is thrust upwardly on the depression of the hand lever, the lug engaging the boss will swing the rear end of the counterbalancing lever upwardly and thereby move the tap spindle downwardly, it being noted that while the counterbalancing lever will be rocked on its axis by the operation of the actuating lever mechanism, yet this mechanism is wholly disconnected from the counterbalancing lever and is capable of a relative movement independently thereof, the purpose of which will presently appear.

The clutch actuating mechanism is actuated to clutch the spindle to the upper pulley 7 for tapping rotation, in the upward thrust of the link 33 in rocking the counterbalancing lever, by means of a detent 41 pivoted as at 45 to the inner side of the rear arm of the lever 35. The rear extremity of this detent has projecting forwardly from it a shoulder $45^a$, which in the normal inactive position of the parts as shown in Fig. 1 stands just behind a finger 46 projecting rearwardly from the sleeve $16^a$ of the toggle lever mechanism before referred to, the said detent being acted on by a spring $46^a$ which holds it yieldingly in this position. Forward of its axis the detent is provided with a tail piece 47 for tripping it as will be presently described.

In the operation of the parts so far described when the hand lever 31 is depressed, the link 33 connected thereto will be thrust upwardly and the lug 39 thereon engaging the boss 40 on the counterbalancing lever, will rock said lever upwardly which will move the tap spindle downwardly and enter the hole in the work. Simultaneously with this action the two armed lever 34 will be rocked on its axis and its rear arm moving upwardly will cause the shoulder on the detent 41 to engage the finger 46 on the sleeve of the clutch actuating toggle mechanism, and swinging said finger upwardly, the toggle will be straightened out and the clutch member 15 shifted and will thereby clutch the spindle to the upper pulley 7. This will cause the spindle to be rotated to effect the tapping operation. In this upward movement of the rear arm 34 of the two armed lever, the tail of the detent will be engaged with an eccentrically mounted roll 48 on the overhanging end of a horizontal shaft $48^a$ sustained by the bracket plate $4^a$ and by such engagement the detent will be tripped and will release the clutch actuating mechanism. Before this releasing action takes place however the finger 18 of the clutch actuating toggle mechanism is caught by a trip latch 49 and the clutch will be held engaged.

The trip latch 49 comprises a hub portion 50 mounted to rock on the horizontal shaft $48^a$ before alluded to, an arm 51 projecting forwardly from the hub and extending alongside the tap spindle above the collar 27, a second arm 52 extending forwardly from the hub and terminating in a rounded end 53 disposed in the path of movement of roll 38 on the two armed lever 35, and a third arm 54 extending rearwardly from the hub and terminating adjacent to finger 18 of the clutch actuating toggle mechanism. The arm 54 carries a shoulder 55 projecting forwardly therefrom and normally held yieldingly in contact with the finger 18, which it will be remembered is fixed to the same sleeve $16^a$ carrying the other finger 46, the said arm 54 being acted on by a spring $54^a$ which holds the arm yieldingly in the position mentioned. When now the toggle is straightened out by the engagement of the detent $45^a$ with the finger 46 as before described in initiating the tapping operation, finger 18 will be moved upwardly with finger 46 and shoulder 55 on the trip latch 49 will snap behind finger 18 and the clutch will be held engaged when detent 41 is tripped as before described to release the clutch actuating mechanism. The spindle being now clutched to the upper pulley for tapping rotation, the tap will screw into the work and cut the threads therein and if no interruption in the action takes place, the operation will continue and the spindle will gradually move down until arm 51 of the trip lever is engaged by a tripping head 56 on the spindle, whereupon the trip latch will be tripped and will release the clutch actuating mechanism, and spring 23 acting on the same will fold the toggle mechanism and shift the clutch member 15 from the upper to the lower pulley and thereby impart reverse unscrewing motion to the tapping spindle. Due however to the provision of my improved actuating lever mechanism I am enabled to effect the tripping of the latch 49 at any time before it is automatically tripped by the trip head 56, and I may thus arrest the tapping operation at any stage in its progression and may start it again, and in this way screw the tap in and out at short intervals thereby effecting the operation with a nursing action or in progressively advancing stages. This action is highly desirable where the nature of the material operated on, as regards its hardness and other conditions, is such that the tapping tool meets with undue obstruction in its continuous advance. By operating the tool back and forth, somewhat simulating the natural hand action in boring into hard materials I am enabled to effect the tapping operation in very hard materials without danger of breakage of the parts.

Figure 2:
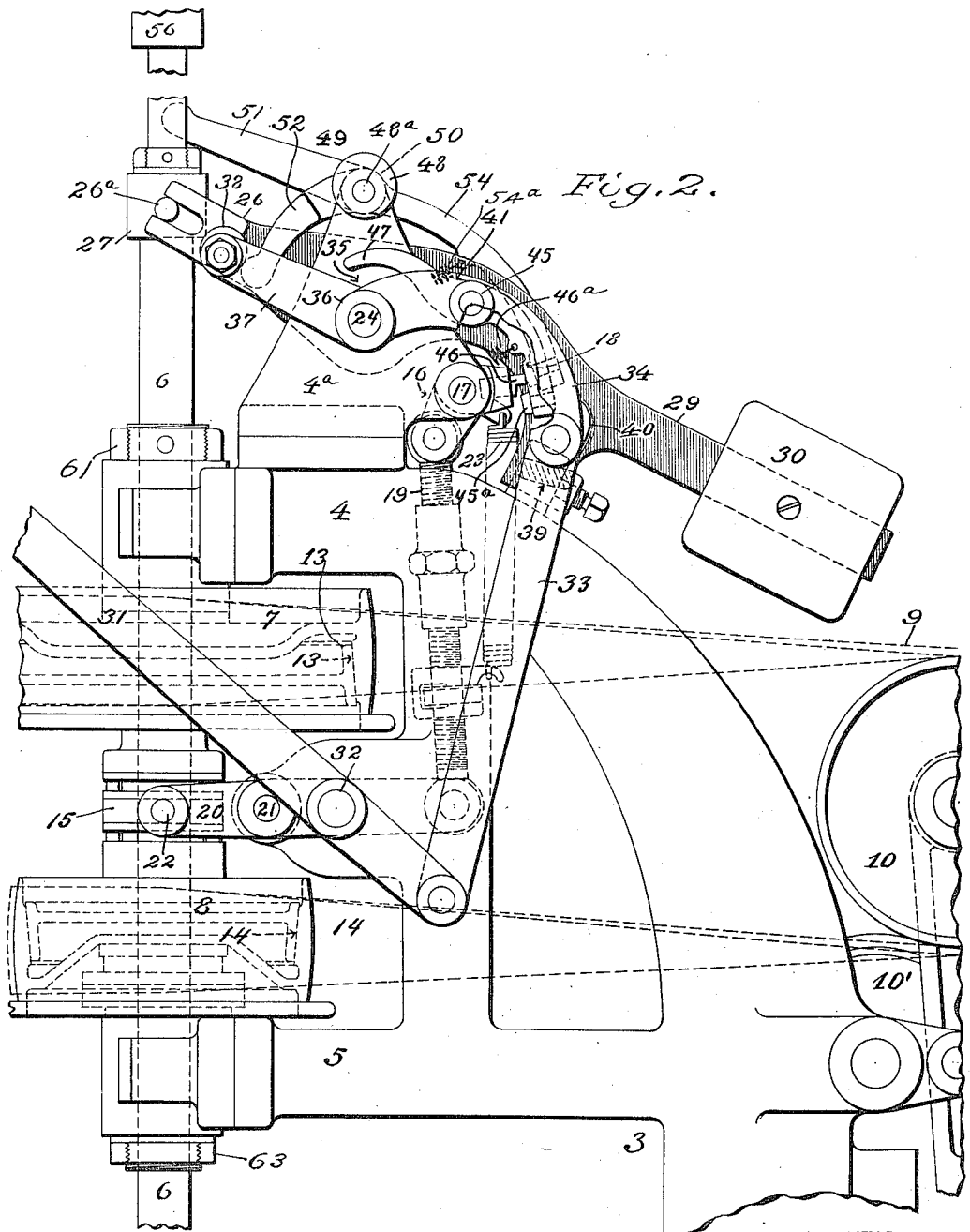
Fig. 2 is a similar view of the upper portion of the same on an enlarged scale showing the position of the parts before the tapping operation is initiated.
Figure 3:
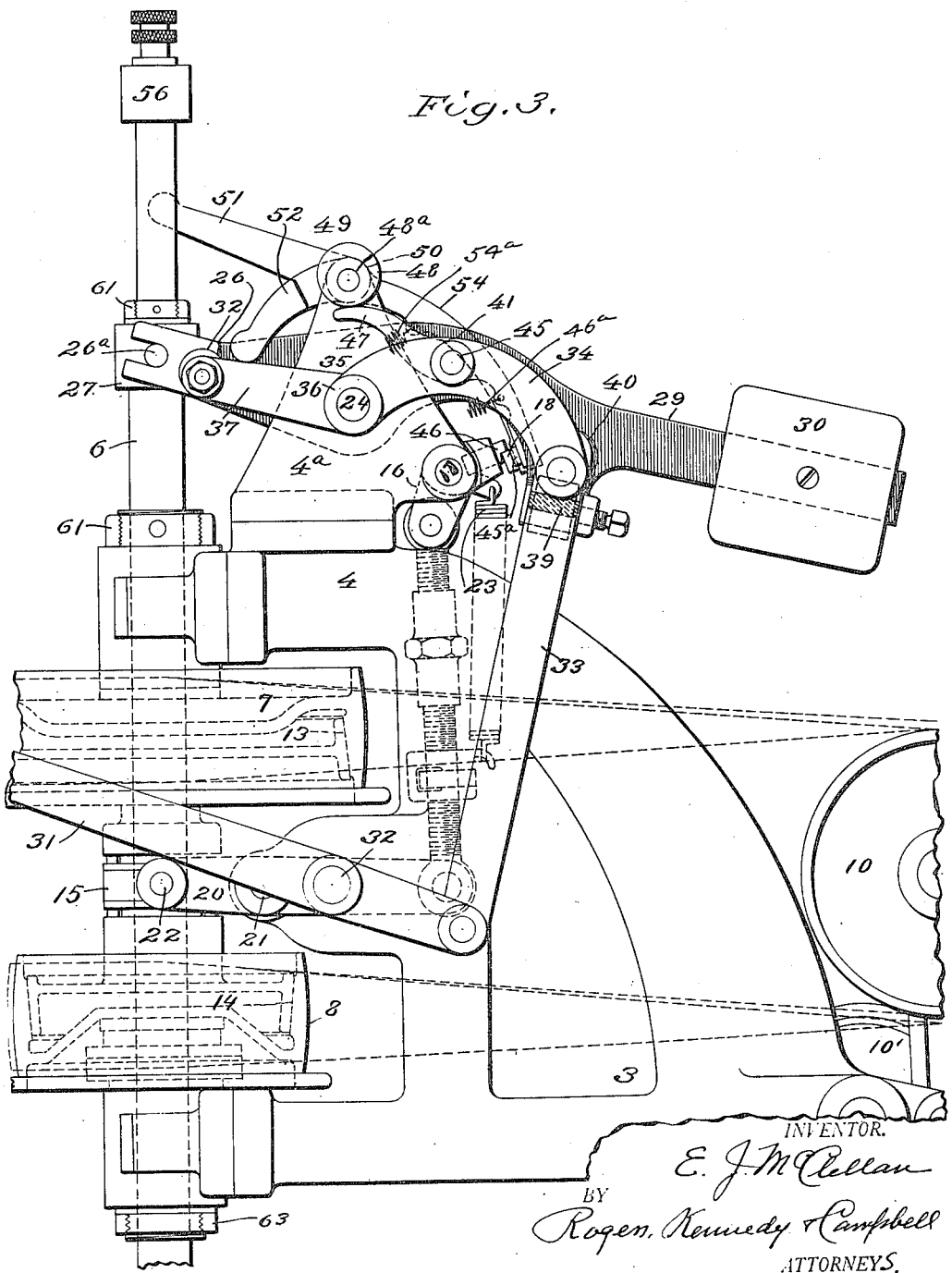
Fig. 3 is a similar view with the parts in the position they occupy after the tapping operation has been started.

This action is effected by the manipulation of the hand lever 31 in rocking the two armed lever 35 independently of and relatively to the counterbalancing lever, such rocking movement of the two armed lever acting to trip the latch 49 and connect the clutch for reverse unscrewing rotation when the hand lever is raised, and acting when the hand lever is depressed to connect the clutch for tapping rotation. Assuming that the tapping operation has been started with the clutch engaged with the upper pulley and held engaged by the trip latch and with the detent 41 disengaged as shown in Fig. 2, and it is desired to unscrew the tap from the work and screw into it at short intervals, the attendant moves the hand lever 31 upwardly and thereby swings the forward arm 37 of lever 35 upwardly which action engaging the roll 38 with the end of arm 52 of the trip latch, will trip the same and release the clutch actuating mechanism, whereupon the clutch member will be shifted from the upper to the lower pulley and the spindle will be reversed and the tap will unscrew. If now the hand lever is moved down, it will rock the rear end of lever 35 upwardly just as it did in starting the tapping operation in the first instance, but in this action the movement of the rocking lever 35 will be relative to the counter-balancing lever as the rear end of the latter is held up by the lowered position of the tap spindle, and this relative movement of lever 35 will result in the reengagement of the detent 41 with the clutch actuating mechanism, and the clutch being operated the spindle will be connected again to the upper pulley for tapping rotation, the trip latch in this action again engaging the clutch actuating mechanism and holding the clutch engaged, while as before the detent will be tripped to release the clutch actuating mechanism. It is seen therefore that by moving the hand lever up and down in opposite directions after the tapping operation has been started, the attendant can cause the tapping tool to reverse its action at short or at any desired intervals and in this way effect the tapping operation in progressively advancing stages and thereby control the reversing action independently of the automatic reversal which has heretofore been effected at the end of the tapping operation.

By my improved mechanism while I retain in the general organization the valuable features of the automatic reversal of the rotation of the tap spindle at the end of the tapping operation or at a predetermined time, at the same time I am enabled by the same actuating lever mechanism employed for initiating the tapping operation, to control the direction of rotation of the spindle at any stage of the operation, and to cause the tap to advance into the work by alternate screwing and unscrewing actions at the desired intervals for the best results.

The details of the mounting of the pulleys 7 and 8 and of the clutch member 15 is shown in Fig. 7 where it will be seen that the upper pulley 7 is provided with an upwardly extending hub 60 journaled in a bearing in a boss on the free end of the frame arm 4, which hub is threaded exteriorly on its upper end and has screwed thereon a nut 61 bearing against the upper end of the boss, antifriction rollers 61ᵃ being arranged between the upper side of the pulley and the lower end of the boss. The lower pulley is provided with a hub 62 extending downwardly therefrom and journaled in a bearing in a boss on the end of frame arm 5, and a nut 63 is screwed on the end of the hub and bears against the lower end of the boss. The boss on the arm 5 extends upwardly from the same in the form of a neck and is exteriorly threaded to receive a nut 65, and a washer 66 surrounds the hub and rests on the nut and constitutes a race plate for antifriction rolls 67 which travel between said plate and the underside of the pulley. From the construction described it will be noted that the lower pulley is supported by the nut 65 through the medium of the anti-friction rolls and the race plate, and that the clutch member, with its two conical heads 13 and 14, extends between the lower pulley and the upper pulley, with the said heads closely adjacent the clutch surfaces of the pulleys. Due to this construction I am enabled to take up for wear between the conical heads and the conical clutch surfaces on the pulleys by screwing the nut 65 upwardly on the threaded neck 64, the effect of which will be to move the lower pulley towards the conical head 14 and thereby move conical head 13 towards the clutch surface of pulley 7, it being understood that the amount of movement of these parts will be such as to establish the proper relations between them while providing for sufficient relative movement of the conical heads to enable a driving connection to be made between one head and its associated pulley, and at the same time avoiding such driving connection between the other head and its associated pulley.

In the foregoing description and accompanying drawings I have shown my invention applied to a form of tapping machine in connection with which it is best adapted, and I have illustrated the invention as embodied in the particular detailed form and construction which I prefer to adopt; but it will be understood that the invention is applicable to other types of machines, and that various changes in the details may be made without departing from the spirit of the invention; and it will be further understood that the invention is not limited to any particular form or construction of the parts except in so far as specified in the claims.

Having thus described my invention what I claim is:

1. In a tapping machine, the combination of a tapping spindle, driving mechanism for rotating the spindle respectively in opposite directions, an actuating-lever operable to initiate the rotation of the spindle by the driving mechanism for the tapping operation, automatic means for causing the reverse rotation of the spindle by the driving mechanism on the completion of the tapping operation, and means operated solely by said actuating lever for causing the reverse rotation of the spindle independently of the automatic reverse.

2. In a tapping machine, the combination of a tapping spindle, driving mechanism for rotating the spindle respectively in opposite directions, a clutch shiftable to connect the spindle with the driving mechanism alternately for rotation to effect the tapping operation, and for reverse rotation to unscrew the tap, an actuating lever and connections therefrom to the clutch to shift the latter to rotate the spindle for the tapping operation, means for tripping the clutch automatically to reverse the rotation of the spindle at the end of the tapping operation, and means operated solely by the actuating lever and acting independently of said automatic tripping action to trip the clutch for the reverse rotation of the spindle.

3. In a tapping machine, the combination of a tapping spindle, driving mechanism for rotating the spindle respectively in opposite directions, a clutch shiftable to connect the spindle with the driving mechanism alternately for rotation to effect the tapping operation and for reverse rotation to unscrew the tap, an actuating lever and connections therefrom to the clutch to shift the latter to rotate the spindle for the tapping operation, means for tripping the clutch automatically to reverse the rotation of the spindle at the end of the tapping operation, and means controlled by the actuating lever and operable to trip the clutch for the reverse action independently of the automatic reverse.

4. In a tapping machine, the combination of a tapping spindle, driving mechanism for rotating said spindle respectively in opposite directions, a clutch device for controlling the operation of the spindle by the driving mechanism, an actuating lever for operating the clutch device to rotate the spindle for the tapping operation, means for automatically tripping the clutch to cause the reverse rotation of the spindle, and means controlled by the actuating lever for tripping the clutch for the reverse action independently of the automatic reverse.

5. In a tapping machine, the combination of a tapping spindle, two driving pulleys rotating respectively in opposite directions, a clutch shiftable to connect the spindle to the respective pulleys to rotate the spindle alternately in opposite directions, an actuating lever and connections to the clutch for shifting the latter to rotate the spindle in a direction to effect the tapping operation, means acting to automatically shift the clutch to reverse the rotation of the spindle at the end of the tapping operation, and means controlled by said actuating lever for shifting the clutch for the reverse rotation of the spindle independently of the automatic reverse.

6. In a tapping machine, the combination of a tapping spindle, driving mechanism for rotating the spindle respectively in opposite directions, a clutch shiftable to connect the spindle with the driving mechanism alternately for rotation to effect the tapping operation and for reverse rotation to unscrew the tap, an actuating lever and connections therefrom to the clutch to shift and engage the same to rotate the spindle for the tapping operation, a tripping latch to hold the clutch so engaged, automatic means for tripping the latch to disengage the clutch at the end of the tapping operation to reverse the rotation of the spindle, and means controlled by the actuating lever for tripping the latch independently of the automatic means.

7. In a tapping machine, the combination of a tapping spindle, driving mechanism for rotating the same respectively in opposite directions, a clutch shiftable to connect the spindle with the driving mechanism alternately for tapping rotation and for reverse rotation, clutch actuating mechanism operatively connected with the clutch, a rocking member engaged with the tapping spindle to lower the same, actuating-lever mechanism adapted when actuated to rock said member and lower the spindle, said actuating-lever mechanism being movable relatively to the rocking member, means on the actuating lever mechanism for operating the clutch actuating mechanism to engage the clutch and rotate the spindle for the tapping operation, when said actuating-lever mechanism is operated to lower the spindle, a releasable latch adapted to hold the clutch so engaged, means on the actuating-lever mechanism in position to engage and trip the latch when said mechanism is operated relatively to the rocking member, and a spring acting on the clutch shifting mechanism to operate the same when released and cause reverse rotation of the spindle.

8. In a tapping machine, the combination of a frame, an up and down movable tapping spindle mounted therein, a counterbalancing lever pivoted to the frame and engaged with the spindle to counterbalance it, a driving mechanism for rotating the spindle respectively in opposite directions, a shiftable clutch member to connect the spindle with the driving mechanism for rotating the spindle alternately in opposite directions, a clutch actuating mechanism sustained by the frame and operatively connected with the clutch member, an actuating-lever mechanism including a hand lever pivoted to the frame, a rocking lever pivoted to the frame above the hand lever and a link connecting said levers, said mechanism adapted when actuated, to rock the counterbalancing lever and lower the spindle, and said mechanism being movable relatively to the counterbalancing lever, a member on said rocking lever in position to connect the clutch for tapping rotation when the actuating-lever mechanism is operated to lower the spindle, a trip latch sustained by the frame in position to releasably engage the clutch shifting mechanism and hold the clutch engaged for tapping rotation, an extension on said latch in position to be tripped automatically when the spindle reaches a predetermined point in its descent and automatically release the clutch shifting mechanism, a second extension on the latch in position to be tripped by the said rocking lever of the actuating-lever mechanism when said mechanism is operated independently of the counterbalancing lever, and a spring acting on the clutch shifting mechanism to operate the same when released and cause reverse rotation of the spindle.

9. In a tapping machine, the combination of a rotary tapping spindle movable up and down, two driving pulleys therefor adapted to be driven respectively in opposite directions, a clutch operable to connect the spindle with said pulleys alternately to rotate the spindle respectively in opposite directions, a hand lever and connections between the lever and clutch adapted when the lever is moved in one direction to clutch the spindle to one of the pulleys for tapping rotation, automatic means controlled by the descent of the spindle for disconnecting the clutch and connecting the spindle with the other pulley for reverse rotation, and means controlled by the movement of the hand lever in the other direction to operate the clutch independently of the automatic means to effect reverse rotation of the spindle.

10. In a tapping machine, the combination of a frame, a rotary tapping spindle mounted therein to move up and down, a counterbalancing lever pivoted to the frame and engaged with the spindle and rockable with up and down movements of the same, an actuating-lever mechanism comprising a hand lever pivoted to the frame and a rocking lever also pivoted to the frame and operatively connected with the hand lever, said actuating-lever mechanism adapted when operated in one direction to rock the counterbalancing lever and lower the spindle, and being movable relatively to the counterbalancing lever, driving mechanism operative to rotate the spindle respectively in opposite directions, a clutch for connecting the spindle with the driving mechanism, means acting when the actuating lever mechanism is operated to lower the spindle, to engage the clutch for tapping rotation, and means acting when said mechanism is operated relatively of the counterbalancing lever, to engage the clutch for reverse rotation.

11. In a tapping machine, the combination of a frame, a rotary tapping spindle mounted therein and movable up and down, a rocking member mounted in the frame and engaged with the tapping spindle, a driving mechanism for rotating the spindle respectively in opposite directions, a shiftable clutch for connecting the spindle with the driving mechanism for such rotation, an actuating-lever mechanism sustained by the frame and movable relatively to the rocking member, said mechanism acting when operated in one direction to rock the rocking member and lower the spindle, a member on the lever mechanism in position to actuate the clutch and connect the spindle with the driving mechanism for tapping rotation when the lever mechanism is operated to lower the spindle, a latch on the frame in position to hold the clutch engaged, automatic means controlled by the descent of the spindle to trip the latch and release the clutch, and a second member on the lever mechanism in position to trip the latch when said mechanism is moved relatively to the rocking member in a direction opposite its first movement; whereby by moving the lever mechanism relatively to the rocking member in opposite directions the spindle may be caused to rotate in opposite directions and thereby effect the tapping operation in successive stages.

12. In a tapping machine, the combination of a tapping spindle, two driving pulleys adapted to be rotated respectively in opposite directions, a clutch shiftable to connect the spindle to the respective pulleys to rotate the spindle alternately in opposite directions, a rocking member engaged with the spindle, an actuating lever, a rocking lever connected with the actuating lever and movable thereby relatively to the said rocking member, said actuating lever adapted when operated in one direction to rock the rocking member, lower the spindle, means on the rocking lever acting when the actuating lever is so moved, to operate the clutch and connect the spindle to one of the pulleys for tapping operation, a latch to hold the clutch so engaged, additional means on the rocking lever to trip the latch when the actuating lever is moved in the opposite direction, and means acting on the clutch when the latch is tripped, to connect the spindle with the other pulley for reverse rotation; whereby by shifting the actuating lever in opposite directions, the spindle may be rotated alternately in opposite directions at desired intervals, after the tapping operation is initiated.

13. In a tapping machine, the combination of a tapping spindle, a driving mechanism for rotating the same respectively in opposite directions, a clutch operable to connect the spindle with the driving mechanism alternately for tapping rotation, and for reverse rotation to unscrew the tap, an actuating lever operable on the clutch to connect the spindle for tapping rotation, a releasable latch to hold the clutch so engaged, and means controlled by the actuating lever for tripping the latch to permit the clutch to connect the spindle for reverse rotation.

14. In a tapping machine, the combination of a tapping spindle, two driving pulleys adapted to be rotated respectively in opposite directions, a clutch shiftable to connect the spindle to the respective pulleys to rotate the same alternately in opposite directions, an actuating lever, means controlled by the movement of the lever in one direction to shift the clutch and connect the spindle to one pulley for tapping rotation, a releasable latch for holding the clutch so engaged, and means controlled by the movement of the lever in the opposite direction to trip the latch and connect the spindle to the other pulley for reverse rotation.

15. In combination with a frame provided with upper and lower aligned bearing openings, upper and lower driving pulleys having hubs mounted in said bearing openings respectively and provided with clutch surfaces, a vertically adjustable member applied to the frame and giving support to the lower pulley, a shiftable clutch member intermediate the pulleys and provided with clutch surfaces adapted to cooperate with those on the pulleys alternately, and a rotary spindle extending loosely through the pulleys and splined to the clutch member; whereby by moving the adjustable member vertically, the wear between said clutch surfaces may be compensated for.

In testimony whereof, I have affixed my signature hereto.

EDWARD J. McCLELLAN.